United States Patent [19]

Rando et al.

[11] Patent Number: 5,256,864
[45] Date of Patent: Oct. 26, 1993

[54] SCANNING SYSTEM FOR PREFERENTIALLY ALIGNING A PACKAGE IN AN OPTIMAL SCANNING PLANE FOR DECODING A BAR CODE LABEL

[75] Inventors: Joseph F. Rando, Los Altos Hills, Calif.; Howard N. Roberts; Thomas C. Arends, both of Eugene, Oreg.

[73] Assignee: Spectra-Physics, San Jose, Calif.

[21] Appl. No.: 764,527

[22] Filed: Sep. 24, 1991

[51] Int. Cl.⁵ .............................................. G06K 7/10
[52] U.S. Cl. ..................................... 235/462; 235/383
[58] Field of Search ............................... 235/383, 462

[56] References Cited

U.S. PATENT DOCUMENTS

| | | | |
|---|---|---|---|
| 4,394,645 | 7/1983 | Humble et al. | 340/572 |
| 4,676,343 | 6/1987 | Humble et al. | 235/383 |
| 4,766,296 | 8/1988 | Barth | 235/383 |
| 4,792,018 | 12/1988 | Humble et al. | 235/383 |
| 4,825,045 | 4/1989 | Humble | 235/432 |
| 4,833,308 | 5/1989 | Humble | 235/487 |
| 4,929,819 | 5/1990 | Collins | 235/383 |
| 4,939,355 | 7/1990 | Rando et al. | 235/467 |
| 4,940,116 | 7/1990 | O'Conner et al. | 235/385 |
| 4,959,530 | 9/1990 | O'Conner | 235/385 |
| 4,964,053 | 10/1990 | Humble | 235/383 |
| 5,118,929 | 6/1992 | Scata | 235/462 |

*Primary Examiner*—Paul M. Dzierzynski
*Assistant Examiner*—Don Wong
*Attorney, Agent, or Firm*—Lyon & Lyon

[57] ABSTRACT

An automated retail point of sale scanning system includes a means for preferentially aligning an item traveling on an item path and through a scanning region such that two or more surfaces to be scanned are stably maintained in a substantially coplanar alignment with a corresponding focal plane of a bar code scanner. Two orthogonally disposed belts define an item path. The belts are tilted at an angle from the horizontal so that an item placed on either belt will have at least two surfaces stably registered by gravity, one surface to each adjacent belt. Alternatively, a stationary platen is disposed orthogonally to a transport belt such that at least two surfaces of the item being scanned are stabilized in a focal plane coplanar with a bar code scanner, one surface of the item being stabilized against the platen and another surface being stabilized against the adjacent transport belt. Scanning is done through O-rings or slots in the belts or platen, or through a transparent plate over which the item moves when it is in the scanning region. A sensor selectively activates one of two or more laser beams having different depths of focus to thereby provide an ideal depth of focus for resolving a bar code label of objects of varying sizes and shapes. The scanned and decoded bar code information is applied to a microprocessor which in turn activates a pattern of pixel elements on a moving display. The system optimizes customer interpretation and recognition of the item while providing minimum reading error.

37 Claims, 12 Drawing Sheets

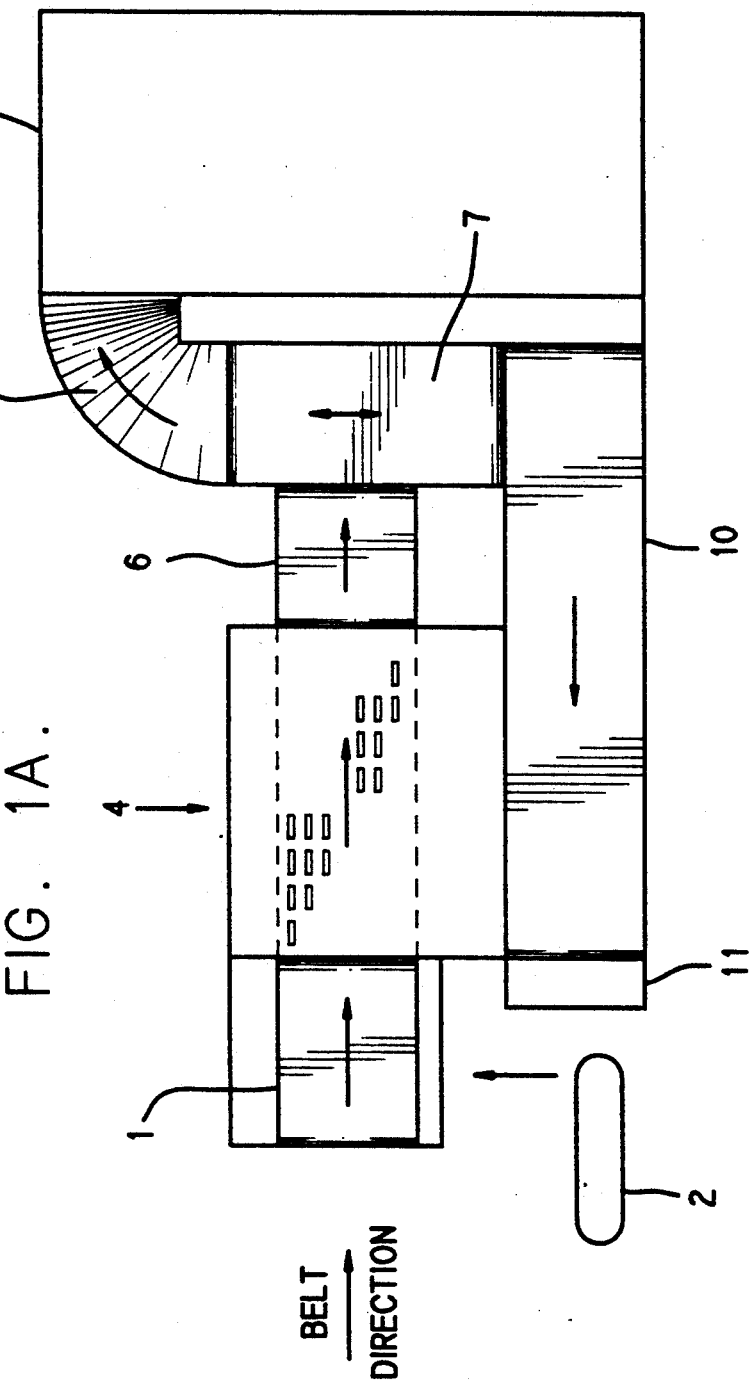

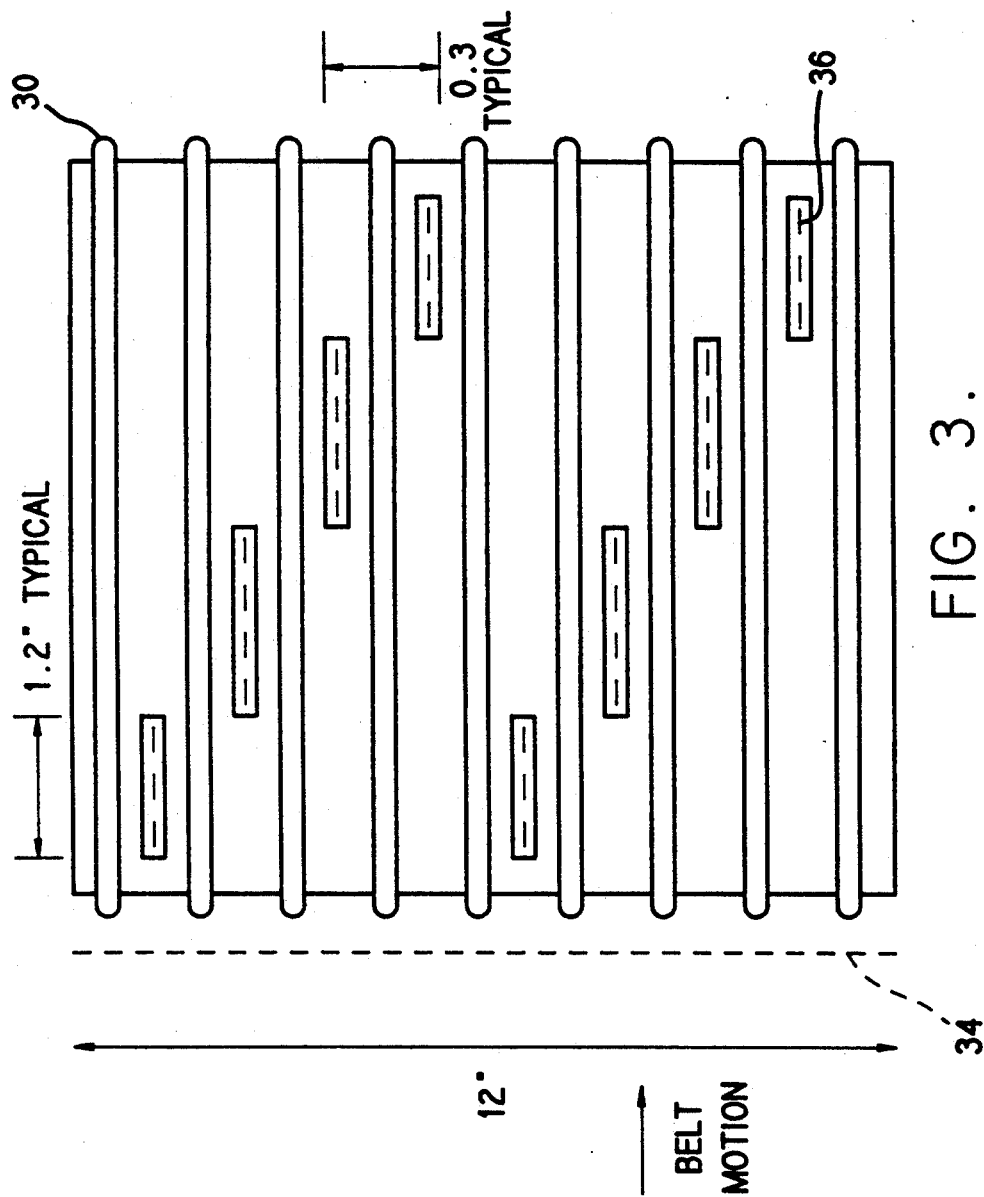

SIDE VIEW OF SCANNER SHOWING HEIGHT SENSING

SCANNING SYSTEM FOR PREFERENTIALLY ALIGNING A PACKAGE IN AN OPTIMAL SCANNING PLANE FOR DECODING A BAR CODE LABEL

BACKGROUND OF THE INVENTION

1. Field Of The Invention

The field of the present invention generally relates to bar code scanning apparatus. More particularly, the field of the present invention relates to a method and apparatus for preferentially aligning the surfaces of an item with respect to a predetermined locus of positions defining an optimal scanning path for decoding a bar code label.

Bar code scanners are well known for scanning the universal product code ("UPC") and other types of bar codes on packages or containers, particularly in retail stores Generally, in retail stores, bar code scanners are set up at check-out stands or are built into a horizontal check-out deck so that a laser beam is scanned up through a transparent window, defining a number of different scan lines. Normally, packages are placed by the customer on a counter, deck or conveyor. A check-out person then takes each package, visually locates the UPC or other bar code label on a surface of the package and moves the package through the laser's scanning area. A disadvantage of this technique is that the label must first be found and then the package must be held in a particular orientation in order to effect an accurate reading by the laser scanner decoding the bar code lines as the bar code moves through the scanning area. Misalignment of the bar lines, or inadvertent movement of the package during the scanning operation can result in a misreading of the bar code.

Conventional attempts to minimize or eliminate the participation of check-out personnel include a device such as described in U.S. Pat. No. 4,939,355. There, an item transported by a moving conveyor is subjected to a complex series of different scan patterns approaching from different sides of the item. This scanning requires a large depth of field for the scan beams. The item to be scanned is placed in any orientation on the scan belt. A scanning means generates scan lines in an X configuration for reading the object in virtually any orientation. Due to the infinite variations in product sizes, irregularities of shapes and differing locations of a bar code label on an item, conventional scanning methods too frequently fail to achieve a first successful read on the pass of the item scanned, which requires rescanning to obtain the data associated with the bar code label being decoded.

Additionally, conventional methods for bar code scanning provide the customer with an itemized listing, such as receipt list, of the items which were scanned. There is a time lag between the time that the items are scanned and the point at which the customer receives the itemized list. This often results in a lack of customer recognition of the items and their associated prices The lack of recognition inherent in a list, disassociated from the items as they are moving on a scanning path, leads to customer misunderstanding and may slow down the check-out process at a retail point of sale.

Another problem associated with conventional automated scanning systems involves security. For example, in the method described in U.S. Pat. No. 4,676,343, the customer must look for each label and then scans the item in the conventional manner. The item is then placed on a conveyor belt for transport and item verification. This system is very slow because of the inexperience of the customer and because of the difficulty in finding the label. This method also does not provide adequate security because the customer can place a higher priced similar item on the belt.

An additional problem in a conventional automated scanning system is a substantial number of "no reads" when an item is not positioned properly in the scanning region. When an item has an irregularly shaped surface, the rate of no-reads tends to be higher for conventional automatic scanning systems.

Accordingly, what is needed is a system for completely stabilizing an item as it is moved along an item path through a scanning region It also would be desirable to register two surfaces of an item to be scanned such that the bar code labels are preferentially positioned in a predetermined, optimal alignment with the scanning lines of a laser bar code scanner.

What is also needed is a method for automatically locating at least two surfaces of a package to be scanned such that the two surfaces are stably registered with respect to a predetermined locus of positions which define an optimal scanning path for a bar code scanner.

What is needed is a system for optimally scanning a bar code label which would increase the first pass read rate to facilitate the checking out of items at a point of sale such as a grocery market check-out area. In this regard, what is also needed is a system for optimally scanning bar code labels on surfaces of an item which are stabilized with respect to an optimal scanning path and which limits the number of directions from which the surfaces of an item are scanned. This advantageously would simplify the scanning process and increase the speed and accuracy of the scanning.

What is also needed in the operation of an automated retail point of sale scanner is a display means for providing a concurrently moving display of pricing data relating to the item being scanned as the item is moved along the item path through a scanning region. This would enhance customer recognition of pricing data with the item purchased and would facilitate the check out process.

The invention facilitates a system of check-out without a check out clerk. In this process, the customer places his or her items on the conveyor belts and they are scanned without the customer having any further contact until the goods are paid for. Items not read may be handled in one of several ways as described in U.S. Pat. No. 4,939,355.

SUMMARY OF THE INVENTION

In order to overcome the above-discussed disadvantages of known bar code or package label scanners, the present invention provides an apparatus for achieving an improved through-put in a checkerless checkout for scanning a bar code label on two surfaces of an item moving along an item path and through a scanning region. According to a first aspect of the present invention, a transport means moves an item along an item path and through a scanning region wherein the focal plane of a laser scanner is automatically oriented in optimal coplanar alignment with a surface of the item being scanned. The transport means comprises a first belt having a surface for moving the item along the item path and a second belt disposed substantially at 90° to the first belt and moving in a parallel direction. The belts are preferably tilted at approximately 30° to the horizontal so that an item placed on either belt will have at least two surfaces stably registered by gravity, one surface to each supporting surface of the belt. The belts may consist of separate sections with a middle section formed from a series of parallel O-rings to allow scanning through the space between the O-rings and at the gap between belts. Alternatively, the belts may have any type of slot or spacing arrangement to allow scanning from a laser scanning means. For example, the orthogonally disposed belts also may comprise a plurality of thin belts arranged in parallel and spaced apart to enable scan lines to pass between the spaces between the belts. As another example, the orthogonally disposed belts may each be a continuous single transparent scratch resistant belt.

It will be appreciated that in accordance with one aspect of the invention, each face of the scanned volume is scanned separately from a separate direction as well. The belts limit the scanning of a bar code label on a belt-contact surface to only two scan directions; along the belt and perpendicular to it. A laser scanning means generates a series of parallel scanning lines which describe a scanning volume in a first direction perpendicular to the first belt. Because the belts are aligned at 90° to each other, at least two generally orthogonally opposed surfaces of the item to be scanned are registered stably by gravity, or by vibration assisted sliding, against a respective surface of the belt. This automatically aligns the scanning bars of the bar code on a first surface of the object with the focal plane of scanning lines which scan the object in a first direction perpendicular to the belt. The scanning means produces a series of scanning lines in a second scanning direction perpendicular to the second belt and thus to the second surface of the item registered to the second belt. Thus, the scanning bars of the bar code label of the second surface of the item are also automatically aligned in a coplanar orientation with the focal planes of the scanning lines produced in the second direction.

In the foregoing double tilted belt design, the items are automatically aligned in an optimal direction for the scanning bars which generally run parallel to the package or item edges. Because of the motion of the belt, a single vertical scan line and an array of horizontal scan lines are sufficient to read a bar code label on either the first or second surfaces of the belt. This aspect of the present invention achieves a first pass read rate of bar code labels greater than 95%. Such a first pass read rate was heretofore unlikely due to the limitations of conventional scanning devices mentioned above.

In accordance with another aspect of this invention, the scanning patterns in the plane of the belts can be generated from a single scanning means. The scanning means preferably may comprise an eight sided polygon, for example, having a series of mirror facets tipped in a well known manner in order to produce the proper line spacing. A desired number of scan lines, for example eight scan lines, reflect off five long mirrors and thereby create 40 scan lines. The single scanning means can be used to scan both sides of the titled belt conveyor. In addition, a single decoding means could decode the return signal from both scan patterns The decoding means is typically a conventional decoding circuit which is well known in the art.

Because the label can be located on any surface, the surfaces not in contact with the belts must be separately scanned. These surfaces not in contact with the orthogonal belts can be at a wide variety of positions and angles. In accordance with another aspect of the invention, a means is provided for establishing an ideal depth of focus for reading the bar codes of symmetric items on surfaces parallel to the belt surfaces, but not in contact, on items of varying widths and heights.

Accordingly, a first laser beam source produces a beam waist sufficiently focused to resolve elements of a bar code of an item greater than a predetermined width. The first laser beam source is focused on half of the volume above the orthogonal belt. A second laser beam source is also focused on the other half of the volume above the orthogonal belts for producing a beam waist sufficiently focused and scanned to resolve elements of a bar code on the surfaces of an object smaller than a predetermined width. A sensor means associated with the first and second laser beam sources is provided for sensing when an item greater than a predetermined width and height is about to be scanned. The sensor means activates the first laser beam source when a large object over the threshold width and height is to be scanned. The sensor means deactivates the first laser beam source and activates the second laser beam source when an object smaller than the threshold size is sensed. Each item surface above the belts is advantageously scanned according to its location. And, because two surfaces of the object being scanned are stably registered by gravity against the supporting surface of orthogonal belts, this aspect of the invention establishes an ideal depth of focus for resolving a bar code label of objects of varying size. In a similar manner a third and fourth laser source, disposed orthogonally to the first and second laser sources, scan the front and back surfaces (relative to belt motion) of an item to produce an optimally focused scanning plane.

In another embodiment, two laser sources may be scanned within the same scanning mirrors in conjunction with two detectors. In this case, the two laser beams produce two beams which are close enough to each other to be scanned by the same mirrored polygon and pattern mirrors, but far enough from each other in angle to be imaged in two different locations by the collection lens. Each beam therefore, has its own waist location and detector. In this method, the beams may be multiplexed with their corresponding detectors for producing a single data stream. Alternatively, the beams may be used simultaneously for producing two data streams. To obtain an increase in the effective depth of focus, the two beams can be focused at different distances.

It will be appreciated that the foregoing aspects of the present invention greatly simplify scanning in comparison to conventional devices and at the same time achieves an optimal alignment of an item bar code label with the scanning lines of a scanning means. This greatly enhances the first pass read rate in comparison with conventional devices.

Another aspect of the invention includes a means for providing a concurrently moving display of data relating to the item being scanned. That is, a visual display of data relating to the item being scanned moves along a belt or other display means in proximity with the item along the item path. This greatly enhances customer recognition and association of pricing data and other information with an item as it moves along the item path. One embodiment of a moving display means includes a continuous belt of film, substantially coextensive with the transport means, wherein the film comprises a material capable of selectively changing color or optical transmission upon exposure to a source of synergistic stimulation such as the application of heat in a specific pattern, or an electric field.

For example, once scanned and decoded, the item bar code information is collected by a point of sale unit and the item description and price are determined in accordance with well known techniques. The description and price information are applied to a microprocessor means which in turn activates a pattern of heating elements, or alternatively, generates a selective pattern of electric fields on the back side of the film to produce an alphanumeric display of the item description and price.

The display means of the present invention provides an advantage over conventional methods, such as an itemized listing, because the visual imagery is composed for easy understanding (and may be in any language). The data display also moves along with the item on the belt and therefore optimizes customer interpretation and provides minimum reading error.

The moving display is also advantageous over conventional itemized lists because it presents information within a fraction of a second from the time that an item is scanned and continuously holds that information for the customer, providing more time to read the data. When a heat sensitive film is used, the visual display will persist as long as the elevated temperature exists, without the need for using electronic refresh memory techniques. In the time it takes the heated belt section to return to its starting point, the belt temperature returns to ambient temperature and is ready to receive a new image. The image endures for a predetermined time and simply fades away as the material cools.

The display means also may comprise a liquid crystal display which changes appearance upon the application of an applied electric field; in this event, the image will not need to be refreshed using well known memory techniques until new information replaces old information. Such liquid crystal material is now commercially available as a thin belt. This product is manufactured by Raychem, Optical Shutters and Taliq Corporations. A special long time constant liquid crystal formulation is required The image on the display means is not limited to alphanumeric representations but may also include any visual display capable of conveying discrimination and meaning.

In accordance with another aspect of the invention, it is also possible to achieve superior scanning and to greatly improve the first pass read rate by using a transport belt having a series of slots or spaces in a supporting surface thereof, and a single guide means disposed orthogonally to the belt. There also could be a plurality of parallel belts, spaced apart to enable scan lines to pass between the spaces. The guide means also could have a series of slots for admitting scanning lines. The guide means preferably may be a stationary platen or a moving platen comprised of a material having a low coefficient of friction such as teflon. According to this aspect of the invention, a customer places an item to be scanned on the belt with one surface flush against the smooth guide means. The guide means automatically orients a first surface of the item adjacent thereto for scanning by a scanning means. The second surface of the item is stably aligned on the moving transport means for scanning by a second scanning source.

It will be appreciated that in accordance with this aspect of the invention, the bar and space elements of a bar code label of a first surface of the item adjacent the guide means are automatically positioned in an optimal coplanar relation with the scanning lines of a bar code scanner which scans the bar code labels through slots or spaces in the supporting platen. Similarly, the bar and space elements of a bar code label on the surface of the item adjacent the orthogonal supporting transport belt are automatically positioned in an optimum coplaner relation with the scanning lines produced by the bar code scanner which scans the bar code label from a perpendicular direction through slots or spaces in the supporting transport belt.

The front and back of the package are scanned by a single scanning system which directs laser beams on the free surfaces. This scanning is done from the top with the beams that scan a pre-set angular range relative to the belt. Since the package is moving toward and away from the respective sets of scan lines, ample time is available for scanning.

It will be appreciated that the present invention greatly simplifies laser bar code scanning in comparison to conventional devices while at the same time achieving a substantially 95% or greater first pass read rate. An enhanced accuracy rate is especially possible for items whose bar code labels are parallel or perpendicular to the package edges. Scanning is limited to two directions wherein two surfaces of the item to be scanned are automatically oriented and in focus at a predetermined plane for enabling the scanning bars of a bar code label to optimally read by a bar code scanner. Sensing the package cross-section perpendicular to the package motion also enables the depth of focus of the scanning beams to be optimized. This configuration greatly enhances the cost effectiveness, speed and accuracy of scanning items at a retail point of sale or the like. The present invention also makes possible the elimination of the checker at a point of sale, thereby providing a primary economic motivation for the implementation of the present system.

DESCRIPTION OF THE DRAWINGS

These and other advantages of the present invention may be appreciated from studying the following detailed description of the presently preferred exemplary embodiment together with the drawings in which:

FIG. 1A is a schematic drawing showing how unread items may be returned to a customer for rescanning or manual check-out;

FIG. 3 is a top view of the preferred spacing of slots between O-rings in the present invention for admitting scanning lines;

DETAILED DESCRIPTION

Figure 1:
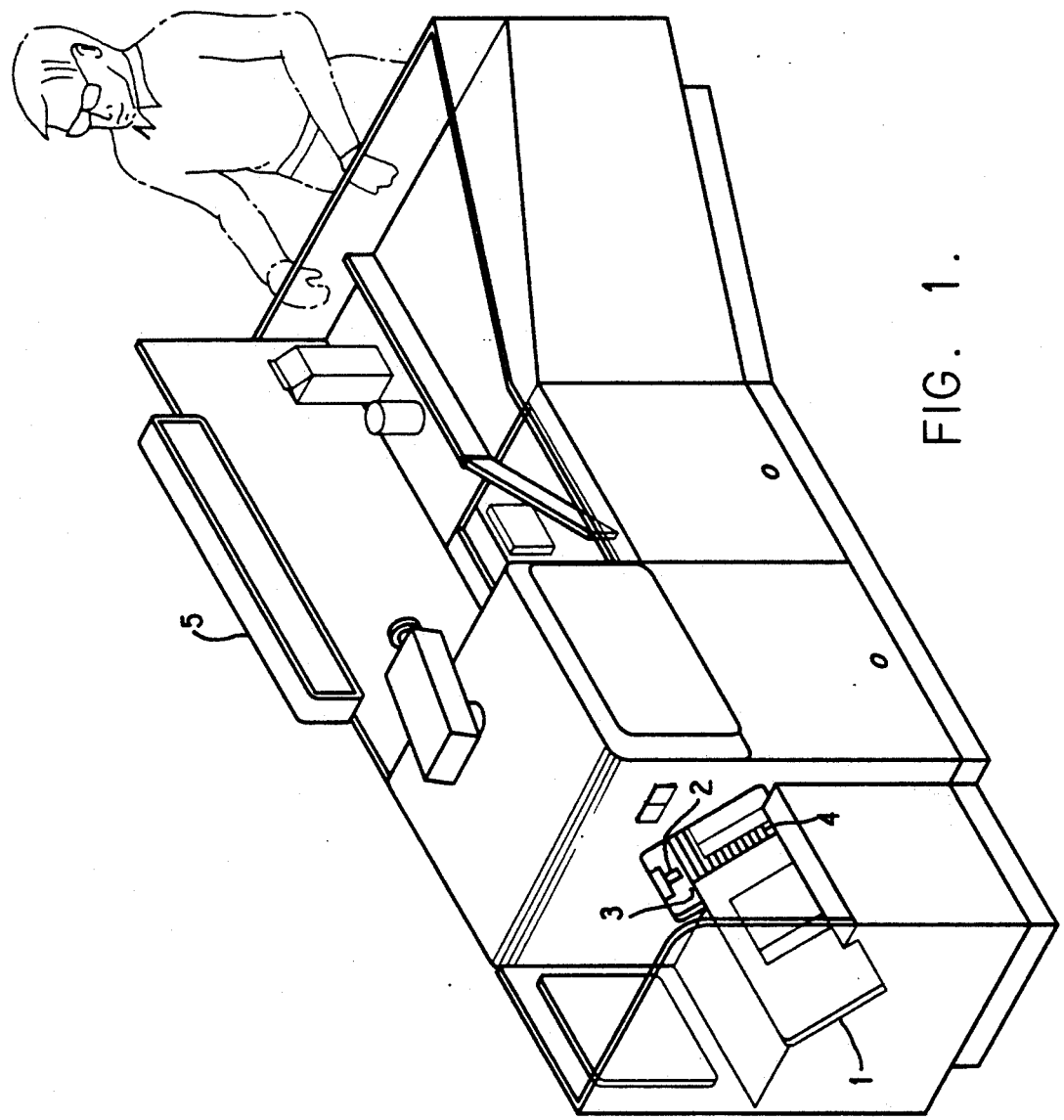
FIG. 1 is a perspective view of an overall system.

In the drawings, FIG. 1 shows a system according to the present invention for preferentially aligning and registering at least two surfaces of a package for optimally scanning a bar code label located on those surfaces.

In an automatic scanning system, as shown in FIG. 1, items are placed on a transport means comprising a belt i for scanning one item at a time. One or more item gates 2 may be provided for sensing the beginning and end of each item. The items are conveyed by the belt 1 into a scanning region 4. An aperture 3 initially provides a means for achieving a general preferential orientation of an item with respect to height and width so that the item will be generally positioned on the belt 1 for scanning as will be explained. A visual display 5 of data relating to the item being scanned moves along a belt or other display means concurrently and in proximity with the item. This enhances customer and security personnel recognition and association of pricing data and other information with the item as it moves along the item path through the scanning region. This display can be used to instruct the customer and to verify pricing for each item.

FIG. 1A is a top view of an arrangement wherein conveyor belts can be used to return items with unread labels to the customer. In normal operation, the customer places the items on the input belt 1. The presence and size of the item in one dimension are measured by the item gate 2 or other item gates along the belt 1. Next, the item moves into the scanning region 4 where the scanned laser beams attempt to read the bar code label. If the item label is read, a read signal is sent to the belt control system, (not shown) in accordance with well-known techniques. After the item has passed scanning region 4, a section of two belts 6 can rotate so as to form a joint with a normal single horizontal conveyor belt. A conveyor belt 7 is directed perpendicular to the rotated conveyor belt 6. This belt can direct the items which were correctly read to the storage area 8. A downward slopping ramp 9 conducts the items into the storage area 8. By reversing the direction belt 7, items which are not read can be sent back to the customer on another belt 10. These unread items are collected on a shelf 11 at the end of the return belt 10. The customer can then place the unread item on the input belt 1 again or carry the item to the pay station where the attendant can read the label in a conventional manner.

Figure 2:
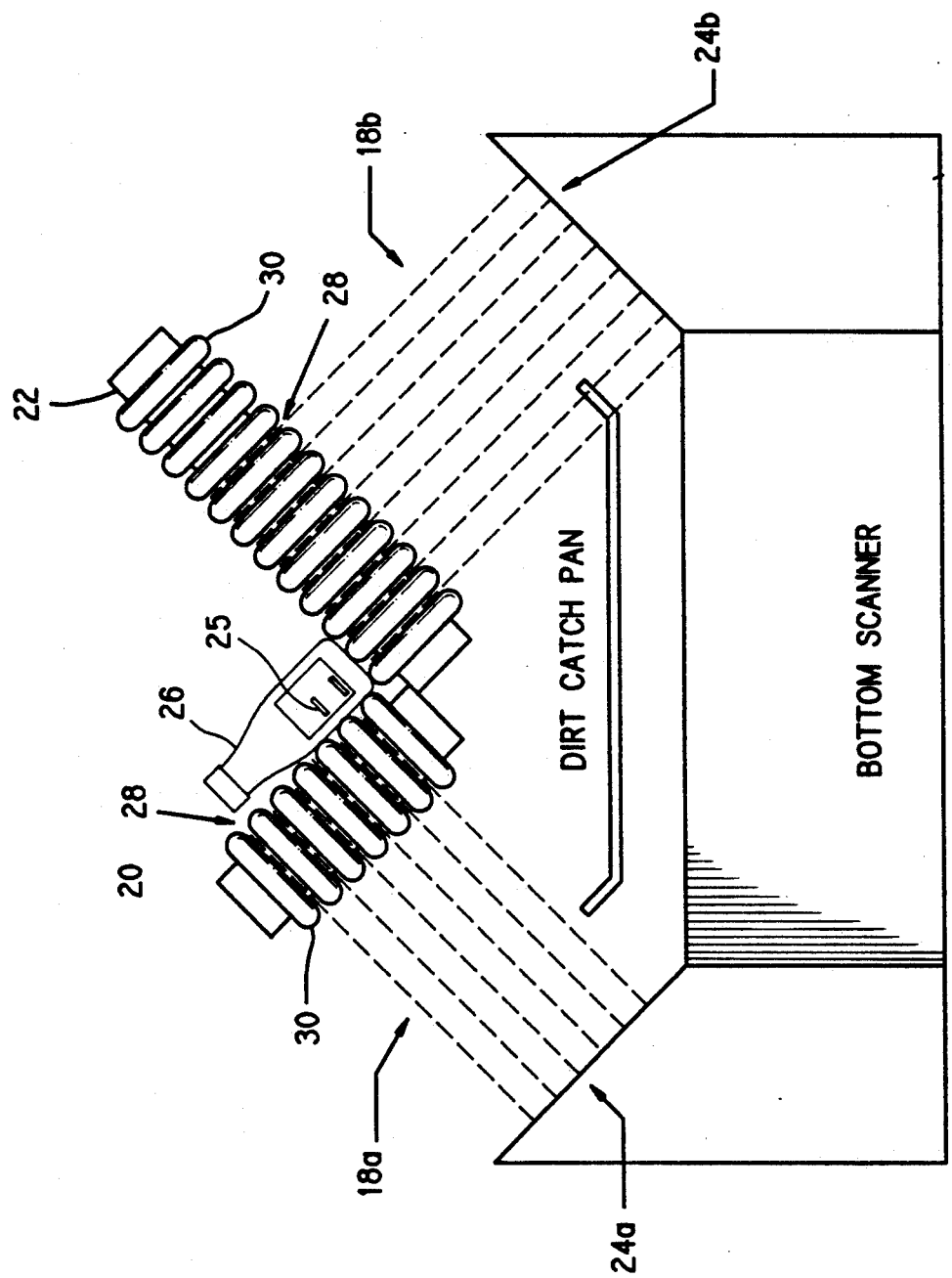
FIG. 2 is a front view showing scanning through the belts of the present invention.

As shown in FIG. 2, the system facilitates the check-out of groceries or other items traveling along an item path and through a scanning region defined by scanning lines 18a, 18b. A transport means preferably comprises conveyor belts 20, 22 which orient two surfaces of a package in a preferential alignment so that a bar code label is registered in an optimal position for reading by a scanning bar code reader as shown generally at 24a and 24b in FIG. 2. A package to be read rests in a trough formed by the two conveyor belts 20 and 22 which are preferably aligned at 90° to one another. This locates two surfaces of most packages and registers a respective surface of a package to each belt. Further, the orthogonal belt combination 20, 22 is tipped at some angle such that the items contact surface of belt 22 and slide due to the force of gravity against the other belt. It will be appreciated that this provides an automatic preferential alignment of two surfaces of the item to be scanned against respective contacting surfaces of the belts 20 and 22. Because the belts 20 and 22 move in unison, the two surfaces of the item are substantially registered in an invariant alignment with respect to a scanning means.

As shown in FIG. 2, the two surfaces of an item 26 are oriented and located in a predetermined plane for reading with the scanning lines 18a and 18b of a scanning means 24a and 24b such as a bar code scanner. This enables the items to be stabilized in accordance with a predetermined, optimal plane, coplanar with a scanning plane for reading the bar code label. The present configuration of two conveyor belts moving in concert may be used in manned check-out systems or in partially or fully automated check-out systems.

In accordance with one aspect of the present invention, as shown in FIG. 2, bar code labels 25 on the surfaces of an item 26 which are in contact or in close proximity with belts 20 and 22 are scanned through a series of slot means disposed in belts 20 and 22. The slot means define slot specific scanning lines at an optimal plane with respect to the item surfaces registered to the belts It will be appreciated that the scanning lines 18a and 18b scan the item in accordance with a predetermined locus of positions which also define an optimal scanning path or focal plane for sensing and decoding a bar code label.

In a preferred embodiment, as shown in FIG. 2, at least two scanner means 24 are disposed for scanning a separate surface of the item 26 through the spaces 28 in the belts 22 and 20 respectively. The belts 20 and 22 limit the scanning to only two scan directions as shown. A first scanning means 24a is disposed substantially orthogonally with respect to the first belt 20 for scanning a corresponding surface of the item 26 disposed on the belt 20. A second scanning means 24b is disposed orthogonally with respect to the second belt 22 for scanning a corresponding surface of an item 26 registered to belt 22.

In accordance with another aspect of the invention, the scanning is accomplished through slot means or spaces 28 disposed in the belt in recurrent rows parallel to the direction of the belt for defining a focal scanning plane coplanar with item surfaces which are registered to the belts. It will be appreciated that the scanning lines 18 defined by the slot means 28 are optimally aligned with the parallel bars of a bar code label disposed on either of the major surfaces of item 26 which are registered to belts 20 and 22, respectively.

Referring to FIG. 3, in accordance with another aspect of the invention, scanning is done through a series of slot means or spaces 28 disposed in the belts 20 and 22, respectively, for defining an optimal locus of positions for scanning lines at the item surface. In a preferred embodiment, slot means 28 comprise a series of O-rings or a plurality of thin flat belts arranged in recurrent rows parallel to the direction of the belts for defining scanning lines at the item surface parallel to the belt. As shown in FIG. 3, scan slots and scan lines 36 are parallel to the O-ring or thin flat belt. One or more scanning lines 34 may be provided perpendicular to the belt. In the instance where both belts are tilted from the horizontal and vertical as in FIG. 2, an item 26 will be preferentially aligned in an optimal direction for scanning the bars of a bar code label 25 which run parallel to the package edges. Because of the motion of the belt, a single vertical line 34 and an array of horizontal scanning lines 36 are sufficient.

It will be appreciated that the scanning lines 34 and 36 may be defined by either O-rings or by slots in a belt or by a belt including a series of smaller parallel belts or a plurality of thin flat belts for creating a desired spacing for admitting scanning lines. FIG. 3 shows a pattern for the example of a 12 inch wide section of belt 20 or 22. In a preferred embodiment, there are a total of 40 horizontal lines on a 0.3 inch spacing. This feature of the invention enables the scanning lines 18 to be automatically aligned in an optimal focal plane with the scanning bars of a bar code label 25 on both surfaces of an item 26 which are registered to the belts 20 and 22. Other belt widths, belt spacing and scan slot lengths can be chosen without departing from the principles of the invention.

Alternatively, scanning may be carried out through a transparent plate of material such as scratch resistant glass. The transparent plate is disposed such that the O-rings or thin belts move the item across the plates. The focal plane of the scanning lines is coplanar with the glass plate and with the lines of the item bar code label as it moves across the plate.

Scanning also may be done through a transparent scratch resistant belt, without the need for O-rings or slots.

A decoding means (not shown) for decoding the scattered light signal generated by the scanning means is provided in accordance with well known techniques. The decoding means includes a microprocessor for producing an output signal representative of the data derived from the scanning of the bar code label in accordance with well known techniques.

Figure 4B:
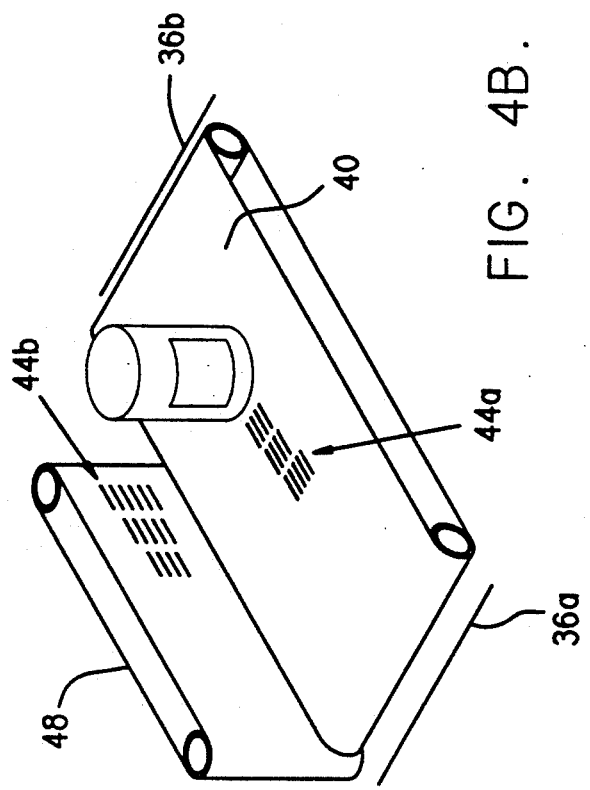
FIG. 4B is a perspective view of another embodiment of the present invention using a moving platen.
Figure 4A:
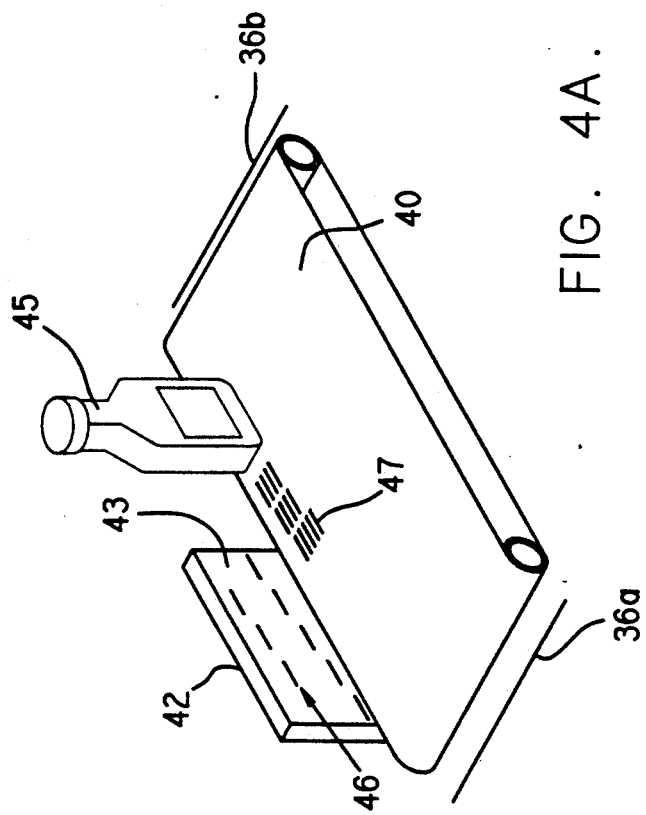
FIG. 4A is a perspective view of another embodiment of the present invention showing a stationary guide means.

Referring to FIGS. 4A and 4B, an alternate embodiment of the present invention provides a means for automatically orienting an item and aligning at least two surfaces with respect to a predetermined locus of positions for defining an optimal scanning path for decoding a bar code label. In FIG. 4A, a means for preferentially aligning an item surface along a moving belt 40 is provided by a platen 42. The platen 42 has a guide surface 43 disposed at 90° with respect to a moving belt 40. The belt and platen may be tipped from the horizontal and vertical position to automatically align a surface of the item against the platen 42 and belt 40 by gravity. Also, vibration assisted registration of surfaces of the item may be employed to stabilize a planar surface of the item to a respective belt. Alternatively, a customer may place a surface of the item against the platen 42 and thereby preferentially align at least two surfaces of the item to be scanned. One surface of an item 45 is substantially invariantly stabilized and aligned by gravity for scanning against the belt 40. The other surface is aligned against the platen 42 by gravity when the scanned surfaces are tilted. The guide surface 43 of the platen 42 is preferably comprised of a slick material having a low coefficient of friction such as teflon. A series of scan lines 46, 47 are scanned through the platen 42 and through the belt 40, respectively. The scan lines 46, 47 run parallel to the package edges and parallel to the direction of the belt. Accordingly, the scanning lines are preferentially aligned in an optimal focal plane coplanar with the bars of the bar code label which also run parallel to the package edges. A single scan line 36a or 36b is arranged to scan perpendicular to belt motion through a narrow slot at either belt end 40.

As shown in FIG. 4B, a moving platen 48 may be provided which travels in concert with the belt 40 and moves the item along the item path in a predetermined, optimal alignment with the scanning lines of a bar code scanner. A series of spaces or through-slots 44b also may be provided in the moving platen 48 for optimally scanning a bar code label of the item adjacent thereto.

In an alternate embodiment, two plates of transparent material, preferably scratch resistant glass, are disposed at substantially 90 degrees to one another. Together, the plates form a trough which defines an item path for preferentially aligning two faces of an item in a predetermined position, coplanar with the respective focal planes of scanning lines produced by a scanning means. Any convenient motive means, such as transport belts or vibration assisted sliding is provided for moving an item along the path formed by the glass plates. Scanning is done through the glass plates. The focal plane of the scanning lines being coplanar with the plane of the glass. In this way, a face of the item is stably registered against a corresponding plate such that the lines of one bar code label are preferentially aligned in a coplanar orientation with the scanning lines from a bar code scanner. This results in a mechanically simplified scanning means. In another embodiment, a transparent scratch resistant belt can be used as the supporting medium, and scanning can be done through the transparent belt.

Figure 5A:
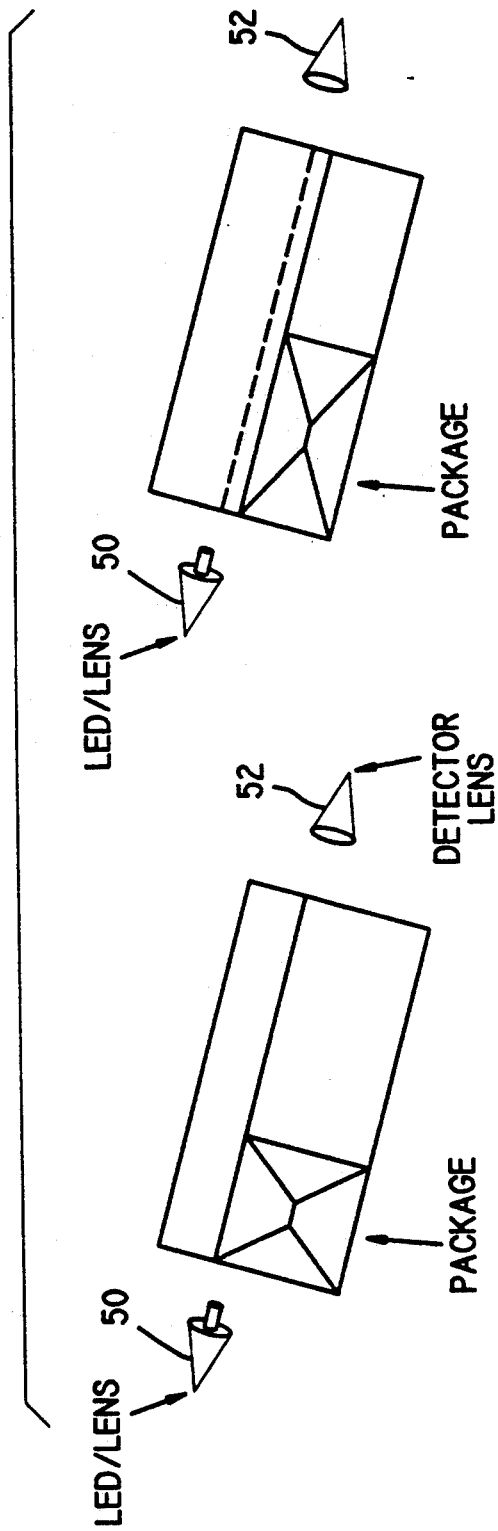
FIG. 5A is a schematic view of the height sensing apparatus of the present invention.

Referring to FIG. 5A, means are provided for automatically establishing the optimal location of the scanning beam waist for resolving a bar code on item surfaces not in contact with either belt. This is important because the location of the bar code label surface can vary depending upon the size of the package. For example, in the height direction, the surface location may vary from 0 to 8 inches. In the width direction, the surface location may vary from 0 to 12 inches. A typical four inch depth of focus as is used in many conventional scanning devices is insufficient to cover this range. In a preferred embodiment, the limiting location of the label surface in the height and width direction is determined by the dimensions of the scanning aperture 14 (FIG. 1) which serves as a rough initial orientation of a package surface to be placed on the transport means 12.

To insure a useful scanning spot size over the approximate eight inch depth, a measuring light beam is projected across the aperture to a detector as shown in FIG. 5A. The projector 50 consists preferably of an LED and a lens. The detector 52 consists of a lens and a photodetector. The measuring light beam determines if the height of a package is greater or less than a predetermined height, for example four inches. The required laser module (see FIG. 6A) is then turned on as needed. The two polarized beams are combined with a polarizing cube, consequently there is no power loss. Since the laser beams are aligned, the detector is always in the correct position. A first laser beam source produces a beam waist sufficiently focused to scan and resolve a bar code of an item greater than a predetermined size, for example a height of four inches. A second laser beam source produces a beam waist sufficiently focused to scan and resolve a bar code of an object smaller than a predetermined size.

The optical projector and detector 50, 52, respectively, of FIG. 5A comprise sensor means which are associated in accordance with well known techniques with the first and second laser beam sources. The LED projector 50 and detector 52 are coupled with the laser beam sources for activating the first beam source when an item greater than a predetermined size is sensed (the beam from 50 does not reach detector 52). The sensor means then activate the second beam source when an object smaller than a predetermined size is sensed. This aspect of the invention optimizes the depth of focus for resolving bar code labels on objects of different sizes. This feature combines with other aspects of the invention to provide a very high first pass read rate of bar code labels.

Figure 5B:
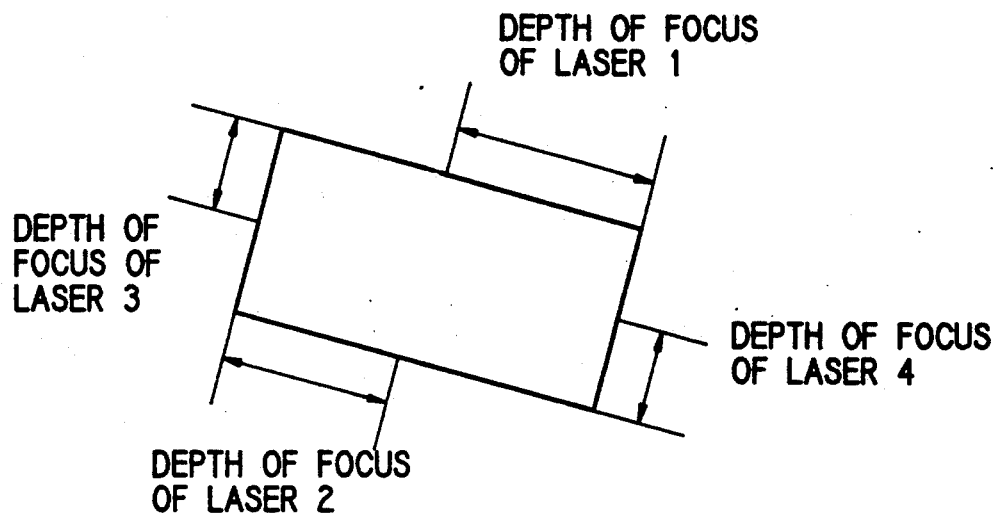
FIGS. 5B and 5C are schematic views of height and width sensing in accordance with the present invention.

As shown in FIG. 5B, a third and fourth laser source are provided for scanning the height as well as the width of the front and back of a package. Thus, the focal planes of the scanning lines are optimized for height as well as width.

It will be appreciated that the foregoing technique may be used in a similar manner in the 12 inch direction wherein the depth of focus must be extended from four inches to six inches. This can be accomplished by using a larger spot size and higher laser power in accordance with well known techniques.

Figure 5C:
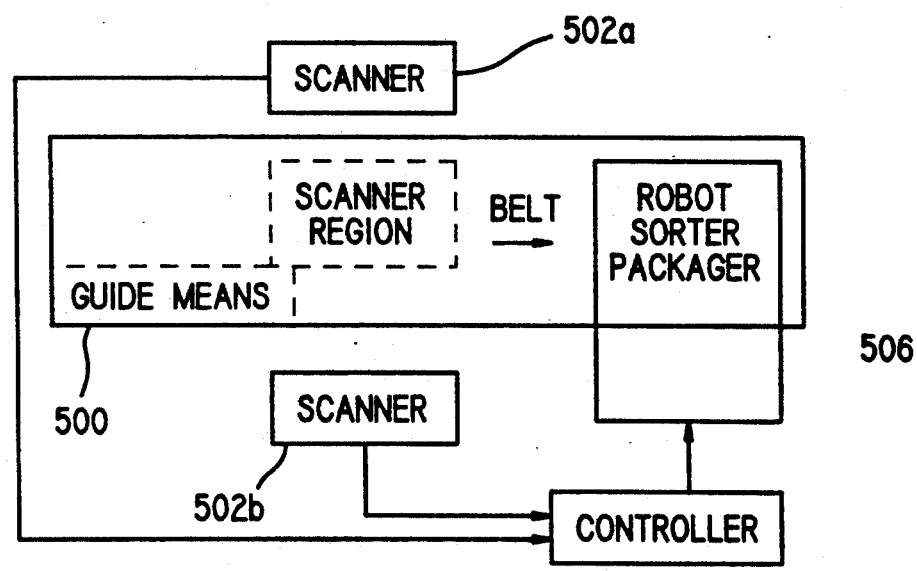

According to another aspect of the invention, the foregoing features make possible the implementation of a fully automated, servo-controlled robot packaging system for sorting, bagging, or packaging items according to their size, weight or other desired parameters. Referring to FIG. 5C, items are placed upon a belt 1 where they are preferentially positioned by a guide means 500 so as to be in an optimal focal plane for scanning by a bar code scanning means as previously explained. Guide means 500 may be a platen or an orthogonally disposed moving belt as set forth above. The items then move along the item path defined by the belt 1 through a scanning region 4. Scanners 502a and 502b scan the items in the scanning region in accordance with well-known techniques as previously explained. The scanners 502a and 502b resolve the bar code labels as described above, and in accordance with well known techniques, produce a decoding signal representative of the information contained in the bar code label. Preferably, scanners 502a and 502b include means for sensing dimensional parameters of an item which are necessary for facilitating packaging and bagging, such as height, width, weight, or the like.

The controller means 504 is responsive to the decoding signals containing the bar code information and dimensional data of items being scanned. The controller means 504 in turn activates a robot sorter means 506 which sorts and packages each of the items in accordance with the information derived from the respective bar code label from that item. The controller means 504 is also responsive to signals from an item gate (not shown) and takes into account the belt speed to activate the robot sorter means 506 at the appropriate time as the item moves along the item path in accordance with well-known techniques. The robot sorter means then sorts each item according to size and weight and bags or otherwise appropriately packages the item.

Figure 6A:
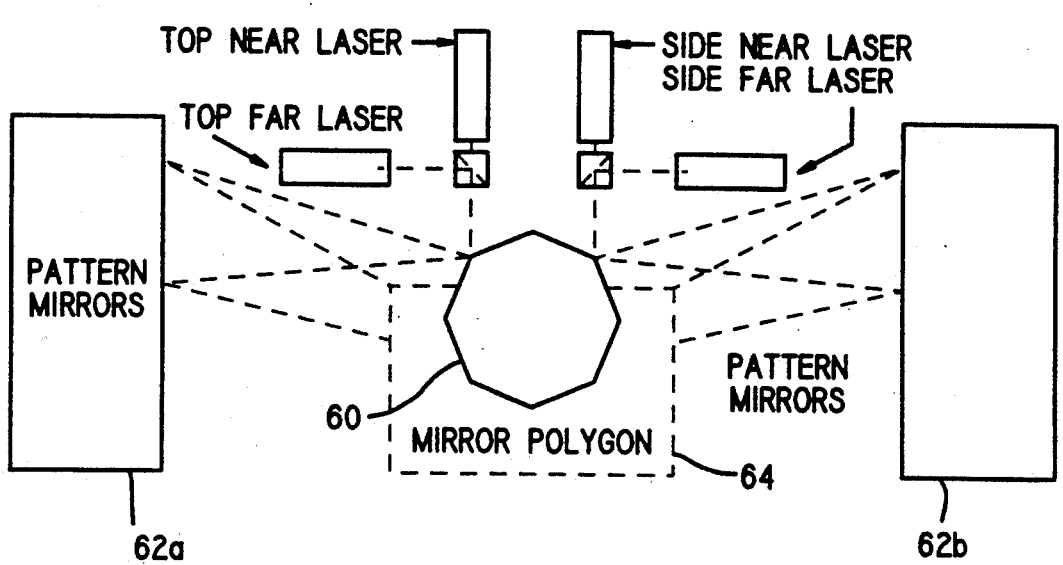
FIG. 6A is a top plan view of one method for generating a scanning pattern for scanning the non-belt contacting sides of the package generally parallel to the belts, surfaces in accordance with the invention.
Figure 6B:
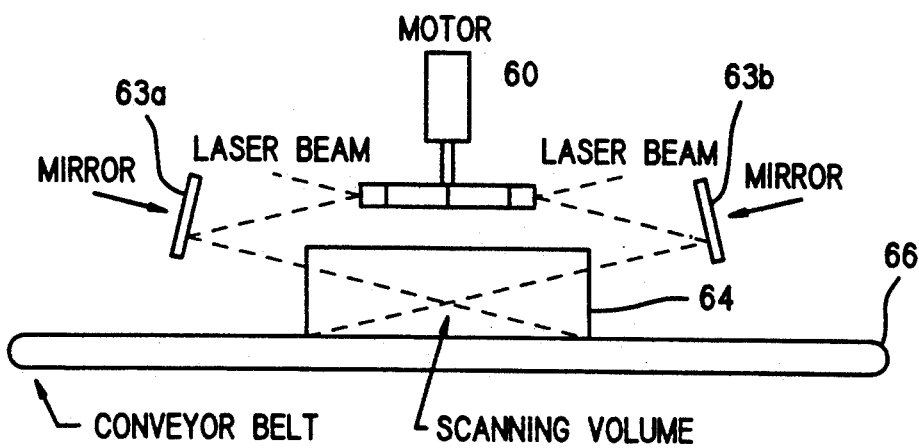
FIG. 6B is a top plan view of another method of generating a scanning pattern for scanning the front and back faces of the package in accordance with the present invention.

Referring now to FIGS. 6A and 6B, another aspect of the present invention provides a single multi-faceted mirror polygon 60 for generating at least two scan patterns for scanning the surface of a package from opposite directions in accordance with a predetermined locus of positions which define an optimal scanning plane congruent with the surfaces of the package registered to the belts. In a preferred embodiment, the optimal scan patterns are generated with a single eight-sided mirror polygon 60 with each mirror facet tipped at a desired angle in accordance with well known techniques. Pattern mirrors 62a, 62b similar to those used on the bottom and side scanners may be used on the top and free side. Other arrangements of pattern mirrors well known in the industry can be used to scan these faces. The scanning mirror 60, in combination with other features of the invention ensure that the focal plane of a laser scanner is automatically aligned in a coplanar relation with respect to a surface of the item to be scanned.

The same mirror polygon 60 can be used to scan both free end faces of a package on the tilted belt conveyor system according to the present invention. As shown in FIG. 6B, the laser beams reflect off the mirror polygon 60 and pattern mirrors 63a and 63b respectively, to produce the scanning volume 64 along to the conveyor belt 66 as shown. It will be appreciated that the scanning volume contains the surfaces of the item to be scanned which is registered in a predetermined location on the conveyor belt 66 as previously explained. The laser modules and pattern mirrors of FIG. 6A are not shown in 6B.

Referring to FIG. 6B, the scan pattern is relatively simple to generate because the package is moving in the direction to bring the beam in and out of focus. At a belt speed of eight inches per second, a four inch depth of focus allows ½ second of time for scanning. Because both surfaces of the object which are registered to the orthogonally disposed belts are scanned at the same time, this allows sufficient time for both the front and back package faces to be adequately scanned.

The system described uses several lasers and scan pattern generators, modules and multiple sets of front-end electronics. There are many streams of data to be analyzed. The decoding may be consolidated into two or perhaps one decoder board. Schemes well known in the art can be used to produce a unique, unambiguous decoder signal for each item scanned.

Figure 6C:
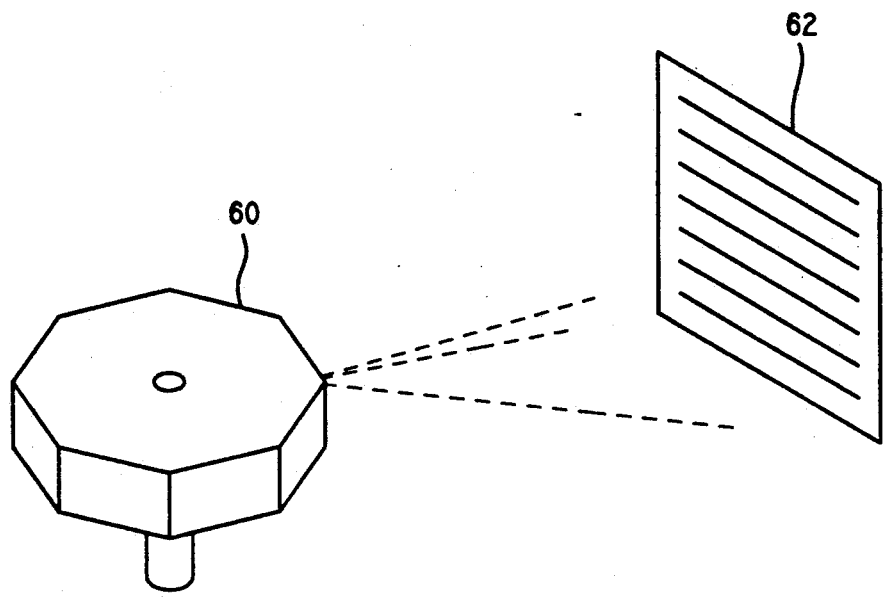
FIG. 6C is a perspective view showing a first arrangement for generating slot specific lines.
Figure 6D:
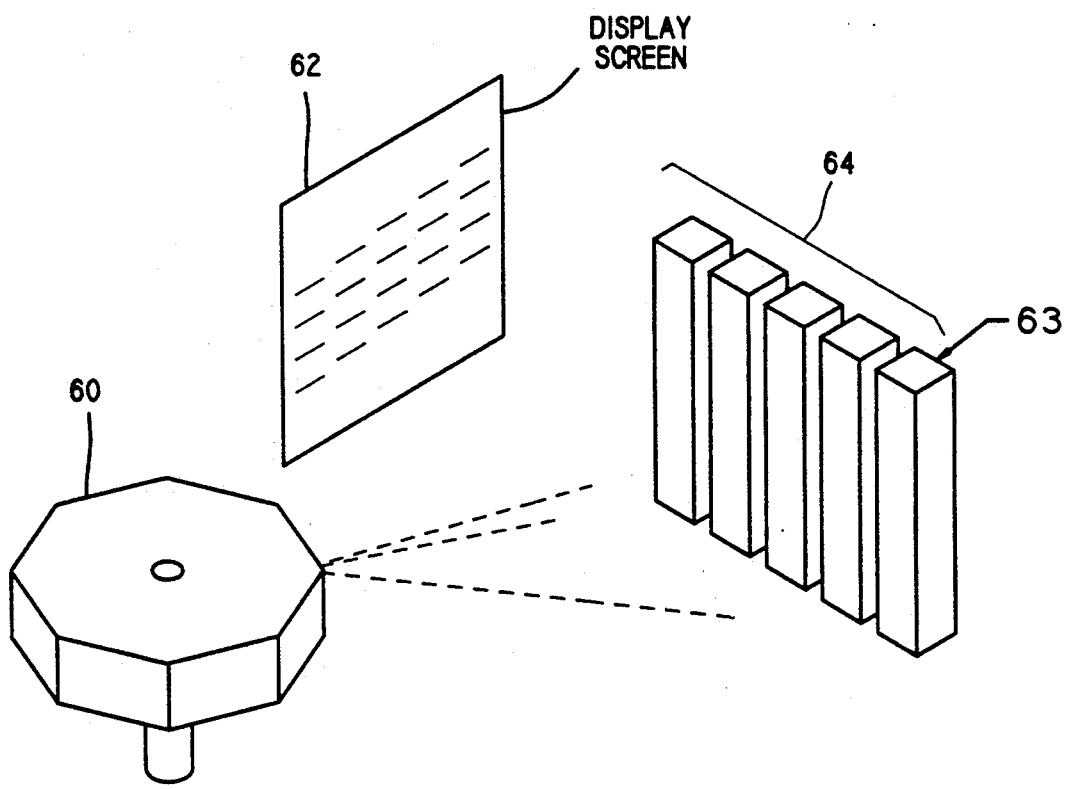
FIG. 6D is a perspective view showing another arrangement for generating slot specific lines.

FIGS. 6C and 6D show the preferred method for generating the slot-specific scanning lines. The faces of the mirrored polygon 60 in 6C can each be set at a different angle relative to the axis of the motor and rotated about a circumference producing an array of parallel lines shown on the display screen. This screen 62 is used for the purpose of description only and does not exist in the scanner.

In FIG. 6D, each mirror 63 and subsequent mirrors forming the pattern mirror array 64 are tilted slightly to segment the scan lines and to direct them to the slots between the belts. The other scan lines required are generated using scan lines which miss mirrors 64 and strike other mirrors (not shown) using techniques which are well known in the industry. Thus, it can be seen that slot-specific scan lines are produced initially by a reflection from a mirrored polygon 60 having a predetermined number (N) of facets, and secondly by a reflection from an array of mirrors 64, wherein the number of mirrors in the array may be designated by M. This arrangement will produce M times N lines which are substantially parallel, but which are spaced apart from one another. The space between the scan lines may be selected by tilting the polygon facets and the mirrors of the array 64.

Figure 6E:
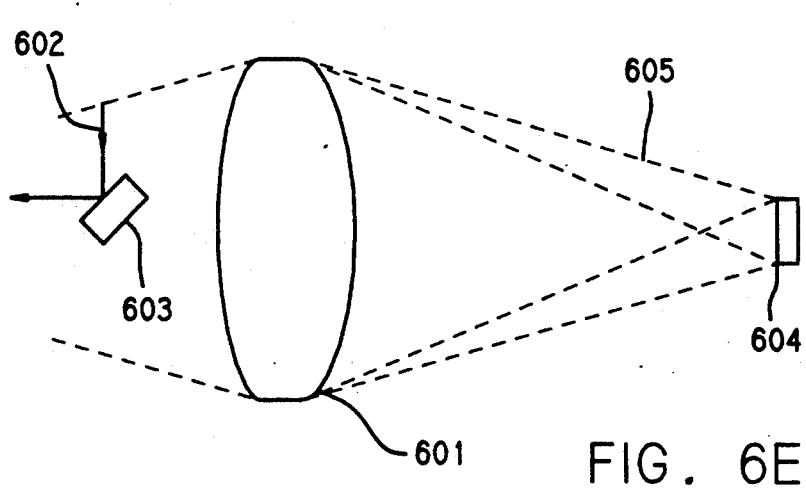
FIG. 6E is a schematic drawing of a conventional means for retro-directive collection in conventional bar codes scanners.
Figure 6F:
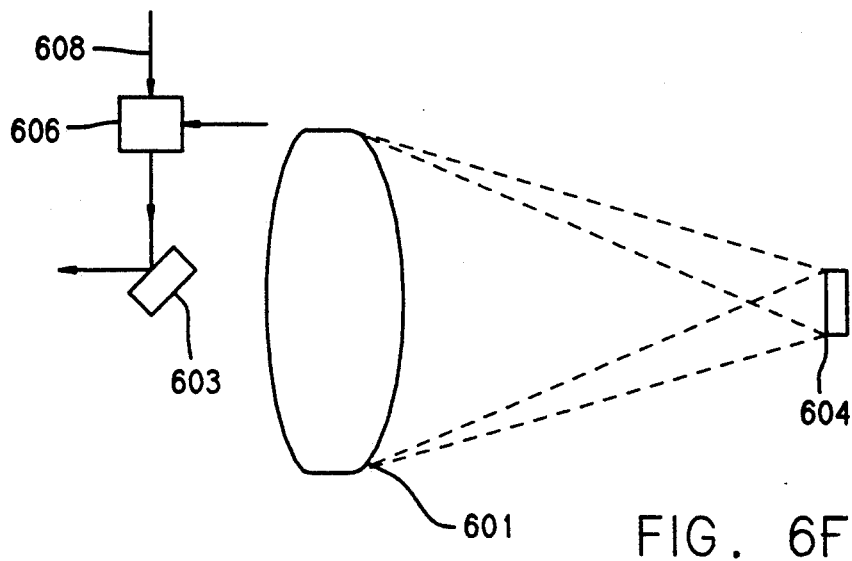
FIG. 6F is a schematic drawing of the light collection method with the depth of focus enhancement method in accordance with the present invention.
Figure 6G:
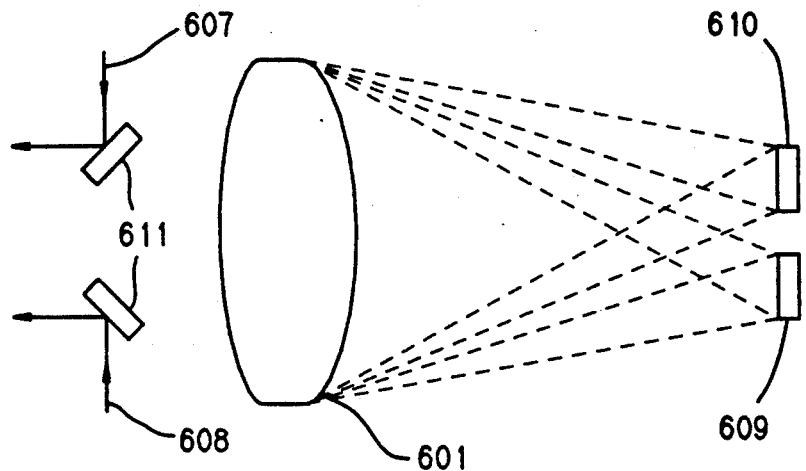
FIG. 6G is a schematic drawing of the light collection method using two laser sources in the same scanning system.
Figure 7A:
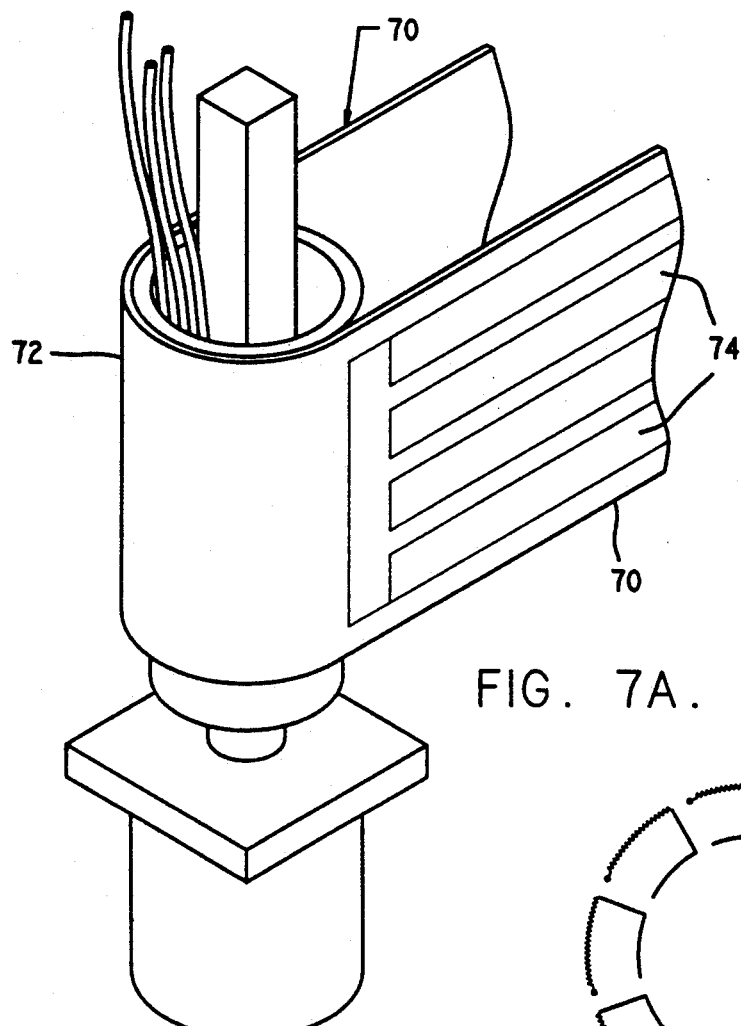
FIG. 7A is a perspective view showing apparatus for generating a visual display image on a thermochromic material or the like in accordance with one aspect of the present invention.
Figure 7C:
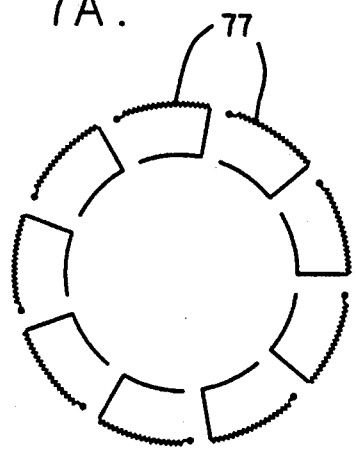
FIG. 7C is a detail of the circuit for the heating roller of FIG. 7B.
Figure 7B:
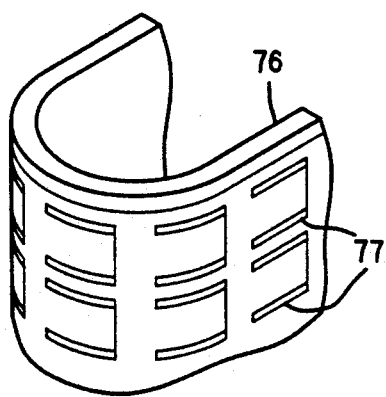
FIG. 7B is a detail of the heating roller of FIG. 7A.
Figure 7D:
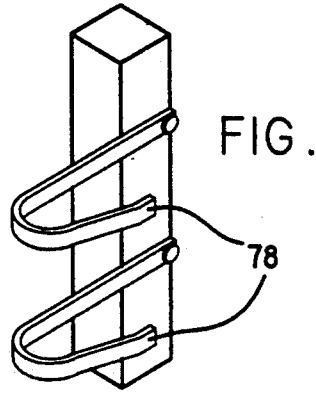
FIG. 7D is a detail of the circuit for the heating roller of FIG. 7A.

FIGS. 6E, 6F and 6G show details of three reflected light collection systems. In the conventional system shown in FIG. 6E, the input laser beam 602 is reflected along the axis of a lens 601 and through the optical system by the small mirror 603. A portion of the light reflected by the label is imaged by the lens 601 onto the detector 604. The angular orientation of the outgoing laser is such that the spot is always imaged on the detector.

In FIG. 6F polarized laser sources 607 and 608 are combined with substantially no loss in the polarizing beam splitter 606. To ensure that the light reflected from the label is imaged onto the same detector, the two laser beams must be substantially parallel to each other. In this embodiment, the appropriate laser beam is switched on by the item sizing sensing method described with respect to FIG. 5.

FIG. 6G shows the detail of a further embodiment in which two laser beams can be used alternately or simultaneously. Each laser beam 607 and 608 is reflected generally along the axis of the lens 601 by mirrors 611. The angular separation of the beams is small enough that the beams are both contained within the scanning mirrors yet they are separated with respect to their angles far enough to be detected by the two separate detectors 609 and 610. This advantageously allows scanning of a greater volume with multiple depths of focus, without the need for a beam splitter. For example, one beam may have a depth of focus in a range of from 10-12 inches, while the other beam may have a depth of focus of 12-14 inches.

In accordance with another aspect of the invention, a display means is provided which is responsive to the output signal of a scanning means for providing a concurrently moving display of data relating to the item being scanned. The display means comprises an alphanumeric display positioned preferably along the conveyor belt or at any convenient location for displaying the price and other data directly next to the item being purchased. Referring again to FIG. 1, as an item moves down the transport belt 1, the price and name or other related data moves concurrently with the item in a display 5. This advantageously enables a customer to see what he is being charged for the item as it is moving down the belt. To be most useful, a long display (about four feet) with two rows of characters may be needed. Other messages to the customer also may be communicated with such a display.

Several display technologies are appropriate for this purpose. They include light emitting diodes (LEDs) and liquid crystal displays (LCDs). An LED array may be programmed to move the alphanumeric data at the belt speed and in alignment with the item being decoded. Preferably, the display is located near the belt so that the customer is provided with an instantaneous alphanumeric display of data corresponding to each item being scanned. However, LED and conventional LCD displays may be expensive to use in such an application. The lower cost LCD display also may be too slow for high belt speed and may necessitate a slower than optimal transport speed for the transport means.

Therefore, in a preferred embodiment, a sheet or belt of material capable of changing color upon application of a predetermined source of synergistic stimulation is used to provide an alphanumeric display along the conveyor belt. For example, a sheet of thermochromic material, capable of changing color upon the selective application of elevated temperature in a predetermined range may be used. Preferably, the sheet or belt of thermochromic material is coextensive with and driven by the same transport means which conveys the items along the item path.

In one embodiment, a thermochromic material is contained in a sheet and changes color from black to bright blue when the surface is heated to about 40° to 45° C. To form a display, the surface of the sheet is selectively heated to form letters and numbers. Referring to FIGS. 7A-7D, a belt of thermochromic material 70 is supported on a roller 72 for coextensive movement with the transport means (not shown). The display material may be, for example, any material capable of changing color in response to heat or to an applied electric current. The heating surface 76 comprises an array of heating elements 77 disposed circumferentially around the roller. The heating elements 77 may be selectively activated by pulsing an electric current through brushes 78 in accordance with well known techniques. The brushes 78 are responsive to signals from the decoding means which in turn decodes the information supplied by the scanning of the bar code labels.

In accordance with well known techniques, the electric current is selectively pulsed to the brushes 78. The brushes in turn selectively activate heating elements 77 to produce a pattern or visual display image of data associated with each item being scanned. It will be appreciated that the thermochromic material is capable of holding an alphanumeric or other image display upon heating for a predetermined amount of time without the need for being refreshed. Upon cooling, the thermochromic material simply reverts to its original color and is ready to be heated again to produce a visual display of data representative of each successive item being scanned by the scanning means.

Figure 8A:
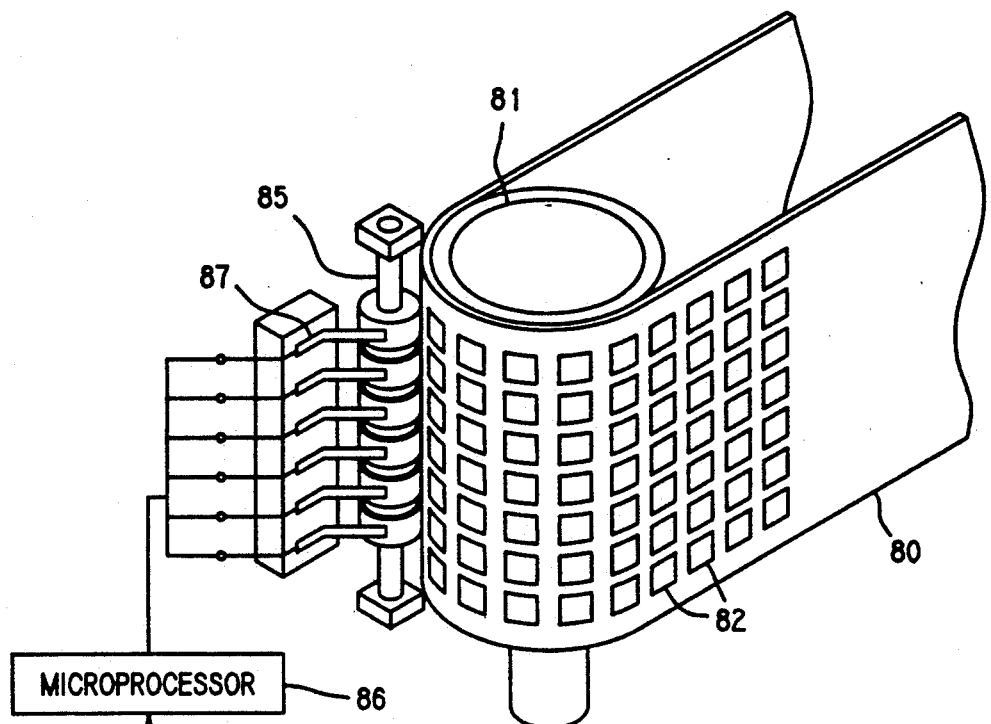
FIG. 8A is a perspective view of an apparatus for activating a pattern of pixels for creating a display image in accordance with an aspect of the present invention.

An alternative embodiment of a display means is shown in FIG. 8A. A sheet or belt of liquid crystal material, such as noematic curvilinear aligned phase material (NCAP) 80 is supportably moved by a roller 81. The NCAP material is currently manufactured by at least three companies, Raychem, Taliq and Optical Shutters. Roller 81 moves the display provided by liquid crystal material 80 such that as the item moves down the conveyor belt, the price and item name also are displayed on the sheet of liquid crystal material 80 and move with the item allowing the customer to see a description of the item and what he is being charged for the item.

The sheet of liquid crystal material 80 includes on the front thereof, an array of pixel elements 82 or other display means for creating a visual pattern or alphanumeric image. An array of pixel elements 82 comprise electrodes which effect the change in transmission of light and consequently effect a change of color in the liquid crystal material 80. As shown in FIG. 8A, each row of pixel elements or electrodes 82 of the array of pixel elements is disposed for contacting a corresponding activating means 84. In a preferred embodiment, the activating means comprises a series of cylinders or rollers 84. The rollers 84 are disposed on a single shaft 85 for contacting the liquid crystal material 80. Each roller 84 is in turn selectively activated by microprocessor 86 through an array of brushes 87 in accordance with well known techniques. The microprocessor 86 is responsive to a decoder 88 which decodes the information on the bar code label being scanned by the scanning means. As each roller 84 is selectively activated, it receives an applied electric current, and in turn, applies an electric charge to a corresponding one or more contacting pixel elements 82 in order to form a display image.

A suitable electrically activated liquid crystal material for application in the present invention is VARILITE, manufactured by Taliq Corporation of Sunnyvale, Calif., a subsidiary of Raychem. VARILITE or NCAP technology is based on the fact that the liquid crystals' molecules orient themselves systematically with an electric charge and randomly without a charge, thereby selectively changing their ability to diffuse the transmission of light.

Figure 8B:
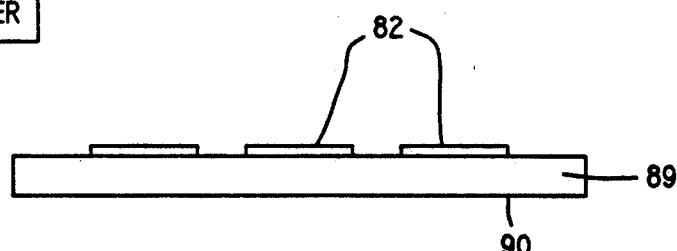
FIG. 8B is a schematic diagram of NCAP liquid crystal display film in accordance with an aspect of the present invention.
Figure 8C:
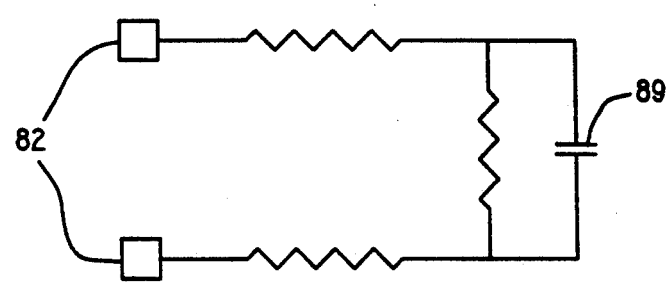
FIG. 8C is a schematic circuit diagram for the LCD film of FIG. 8B.

Referring to FIGS. 8B and 8C, the pixel elements 82 change their structural domains in response to an applied voltage, and thereby change color to form an alphanumeric display. A typical RC circuit for activating the pixel elements is also shown in FIG. 8C. In this embodiment, pixel elements 82 represent an array of electrodes on the control electrode side of the film 80. A capacitance is formed by the individual electrodes 82, an intermediate dielectric material 89 and a common conductor 90 as shown. This forms a basic RC circuit. The resistances $R_1$ and $R_2$ are inherent in the area of the film between the electrodes 82. The values of the resistances $R_1$ and $R_2$ may be adjusted by selectively doping the material 80 in accordance with well known techniques. Making the value of $R_2$ smaller through deficient doping allows a longer time constant. The RC circuit is activated by a signal from microprocessor 86 in response to decoding signals from the decoder 88.

While the invention has been described in connection with what is presently considered to be the most practical and preferred embodiments, it is to be understood that the invention is not limited to the disclosed embodiment but, on the contrary, is intended to cover various modifications and equivalent arrangements included within the spirit and scope of the appended claims. For example, with regard to the moving display, a microprocessor may selectively activate certain brushes which in turn activate selected heated zones to form a pattern on a thermochromic material in accordance with decoding signals. Also, the display elements may be either passive electrochromic devices which modulate ambient light in response to decoding signals from the bar code scanners, or may be elements which actively emit light and change color in response to an applied decoding signal such as an array of light emitting diodes. However, in such a structure the display apparatus is movably coupled to the transport belt to provide a moving display of the item as it moves along the belt. Therefore, persons of ordinary skill in this field are to understand that all such equivalent structures are to be included within the scope of the following claims.

What is claimed is:

1. A scanning system for preferentially orienting and optimally scanning items moving through an item path including a scanning region, comprising:

scanner means for scanning faces of an item and for producing a signal representative of the identity of the item;

transport means having a supporting surface for supporting a first side of an item and moving the item along the item path; and means for stabilizing at least a second side of the item, the stabilizing means being angularly oriented with respect to the transport means, wherein one of said transport means and said stabilizing means is tipped at some angle above horizontal for allowing gravity to move the item downward toward a preferential orientation and in position for one or more focal planes of scan lines from the scanner means.

2. A scanning system according to claim 1 wherein said transport means and said stabilizing means are constructed and arranged to allow gravity to move the item downward into position against the other of said transport means and said stabilizing means with the first side in alignment with a first focal plane of scan lines from the scanner means and the second side in alignment with a second focal plane of scan lines from the scanner means.

3. A system according to claim 1 wherein said transport means includes a belt and said means for stabilizing includes a platen having a surface disposed along an edge of said belt for orienting the second side of the item in coplanar alignment with respect to the focal plane defined by a plurality of scan lines produced by said scanner means.

4. A system for preferentially orienting and optimally scanning labels printed or affixed to items moving through an item path including a scanning region comprising:

transport means having a supporting surface for moving an item along the item path;

means for stabilizing one or more sides of the item in alignment with one or more focal planes of scan lines from a scanner for reading a label;

scanner means for scanning faces of the item and for producing a signal representative of the identify of the item, wherein said means for stabilizing the item in alignment includes a platen having a surface disposed along an edge of said transport means for orienting a surface of said item in alignment with respect to the focal plane defined by a plurality of scan lines produced by said scanner means and wherein said platen is provided with a series of slots through which said scanner means scans at least one face of the item.

5. A system according to claim 4 wherein said platen is comprised of a slick material having a low coefficient of friction such as teflon.

6. A scanning system for preferentially orienting and optimally scanning labels printed or affixed to items moving through an item path including a scanning region comprising:

transport means having a supporting surface for moving an item along said item path;

means for stabilizing one or more sides of the item in alignment with one or more focal planes of scan lines from a scanner for reading a label;

scanner means for scanning faces of the item and for producing a signal representative of the identity of the item, wherein said means for stabilizing is a moving platen having a surface moving in concert with said transport means and disposed substantially orthogonally to said supporting surface of said transport means to substantially register an item in a predetermined alignment through said item path with respect to said scanner means.

7. A system according to claim 6 wherein said moving platen is provided with a series of through-slot means for enabling the scanning of an item through said platen when said platen is moved into said scanning region.

8. A system for preferentially orienting items moving through an item path including a scanning region to position the items' bar code labels in optimal alignment for reading by a scanning means comprising:

a transport means including a first belt having a series of spaces disposed in a supporting surface for moving an item along a predetermined path including a scanning region, and a second belt disposed substantially orthogonally to said first belt and having a series of spaces therein, at least one belt being tipped at some angle above the horizontal such that surfaces of the item are registered against a respective belt surface by gravity for stably positioning the item so that the bar code labels are optimally positioned for decoding;

at least two scanner means, each disposed for scanning a respective surface of said item through said spaces in said first and second belts and for resolving a bar code label on said item surfaces.

9. A system according to claim 8 wherein said spaces in said first and second belts are formed by a series of O-ring means disposed apart from one another in a respective belt surface for enabling said scanner means to scan the bar code label on the surface of the item registered to the belt through the spaces formed by said O-rings.

10. A system for preferentially orienting an item moving through an item path including a scanning region to optimally scan an item with a scanning means, comprising:

a decoding means responsive to said scanning means for identifying an item;

storage means for recall of item specific information for each item;

means for providing an output signal representative of said item specific information;

handling means responsive to said item specific information from said storage means, said handling means including controller means for processing said item specific information and robot sorter means responsive to said controller means and disposed in said item path for sorting items having similar parameters into a predetermined position for facilitating bagging and/or packaging.

11. A system according to claim 10 wherein said item information in said storage means includes information relating to item packaging parameters including size, shape and weight.

12. A system for preferentially orienting an item moving through an item path including a scanning region to optimally scan an item with a scanning means, comprising:

a decoding means responsive to said scanning means for identifying an item and including storage means for recall of item specific information for each item, said decoding means providing an output signal representative of said item specific information, said item specific information in said storage means including information relating to item packaging parameters;

handling means responsive to said item specific information from said decoding means for facilitating bagging and packaging, wherein said item specific information in said storage means includes information relating to item packaging parameters including size, shape and weight, wherein said handling means for facilitating bagging and packaging includes controller means for processing said information relating to item size, shape and weight, and robot sorter means responsive to said controller means and disposed in said item path for sorting items having similar parameters into a predetermined position for assisting in automatically bagging and packaging one or more items.

13. A system for preferentially orienting an item moving along an item path including a scanning region with respect to a locus of positions defining an ideal scanning path for resolving a bar code label comprising:

a transport means for moving an item along a predetermined path including a first belt means, having a series of slots in a surface thereof, for movably supporting a face of the item along the item path in coplanar alignment with the focal plane of a first set of scan lines produced by a scanner means;

a second belt means disposed orthogonally to said first belt means, including a series of slots in a surface thereof, for supportably moving a second face of said item in concert with said first belt means, at least one belt means being tilted at an angle above the horizontal plane so that the item has a surface registered to a corresponding surface of each belt means;

scanner means for scanning said bar code labels through said spaces in said belts and for producing a decoding signal representative of the identity of said item and the data associated therewith.

14. A system for preferentially orienting an item moving through an item path including a scanning region to position at least two surfaces of the item stably in a predetermined plane for reading a bar code label with a bar code scanning means comprising:

a transport means including a plurality of flat belts, spaced apart to permit scanning therethrough and providing a supporting surface for moving the item along the item path past a bar code scanning means;

guide means orthogonally disposed to said belt for orienting a surface of said item with respect to a predetermined plane for scanning by said scanner means;

a series of slot means disposed in said guide means in rows parallel to the direction of said transport means for defining slot specific scanning lines in a focal plane coplanar with the item surface adjacent said guide means;

scanner means for scanning a laser beam in a first plane for reading a bar code label on the surface of an item adjacent said guide means and for producing a scanning beam in a second plane for reading a bar code label on the surface of said item adjacent said belt.

15. A system according to claim 14 wherein said guide means comprises a plurality of flat belts spaced apart for scanning therethrough and for supportably moving the item in a preferential alignment with a scanning means.

16. A system according to claim 14 wherein said guide means comprises a stationary platen composed of a material having a low coefficient of friction such as teflon, for providing stable registration of a first surface of an item with respect to said scanning plane.

17. A system according to claim 14 wherein said guide means comprises a moving platen disposed orthogonally to said belt, and said belt and platen are tilted at a level above the horizontal plane to provide stable registration of at least two surfaces of the item with respect to said scanning means.

18. A system for providing preferential alignment of an item moving on an item path including a scanning region such that at least two surfaces of the item are stably registered in a plane substantially coplanar with a respective focal plane of a bar code scanner means comprising:

a transport means including a first series of thin flat belts, spaced apart to permit scanning therethrough and for providing a supporting surface for moving the item along the item path past said bar code scanner means and a second series of thin flat belts, spaced apart and disposed orthogonally to said first series of belts for orienting a surface of said item with respect to a predetermined focal plane for scanning by said scanner means;

scanner means for scanning a laser beam in a first focal plane coplanar with a surface of said item registered to said first plurality of flat belts for reading a bar code label on said surface and for producing a scanning laser beam in a second focal plane coplanar with a second surface of said item adjacent said second series of flat belts for reading a bar code label on the second surface of the item.

19. A system for automatically positioning an item label on a surface of an item moving along an item path, including a scanning region, in an optimal alignment for scanning, comprising:

scanning means for directing a scanning beam to a predetermined locus of positions defining a first focal plane for scanning a first surface of the item and for simultaneously defining a second focal plane for scanning a second surface of the item;

transport means including a first belt means having a supporting surface for moving the item past said scanning means;

guide means adjacent said first belt means for registering at least a first and second surface of the item in a predetermined alignment with respect to the supporting surface of said first belt means and the surface of said guide means, respectively;

slot means provided in at least one of said first belt means and said guide means for enabling scanning therethrough by said scanning means.

20. A system according to claim 19 wherein said slot means for enabling scanning includes at least one scratch resistant glass window having a supporting surface at least partially coextensive with the surface of said belt means to enable the items to be scanned through the window as the belt means moves the items through the scanning region.

21. A system according to claim 19 wherein said guide means includes a platen having one or more windows therein for enabling scanning therethrough and for defining a focal plane coplanar with a first surface of said item and wherein said first belt means is provided with one or more windows parallel to said belt direction to enable scanning therethrough and defining a focal plane coplanar with a second surface of said item.

22. A system according to claim 19 wherein said guide means includes a second belt means moving in concert with said first belt means, said first and second belt means being tilted at an angle above the horizontal to provide stable alignment of first and second surfaces of the item being scanned in coplanar relation with respect to said first and second focal planes.

23. A system according to claim 19 wherein said scanning means includes a laser beam source and a mirror means having a plurality of mirror facets arranged in a polygon for reflecting the laser beam off of a plurality of rectangular mirrors arranged to direct said laser beam to describe a predetermined locus of scan lines defining a respective focal plane substantially coplanar with a corresponding respective first and second face of an item being scanned to provide an optimal first pass reading of a bar code label on the item.

24. A system according to claim 19 wherein said scanning means includes means for providing slot-specific scan lines by first reflecting a laser beam from a polygon of N facets and secondly by reflecting the beam from an array of M mirrors producing M×N scan lines which are substantially parallel to each other but which are spaced apart and wherein a space between the scan lines is formed by tilting the polygon facets and the mirrors of the array.

25. An apparatus for automatically positioning an item moving in an item path through a scanning region to achieve optimal alignment of an item bar code label with the scanning lines of a bar code scanner means comprising:

transport means including a first belt having a supporting surface and slot means provided therein for admitting slot specific scanning lines through said supporting surface and for stably registering a first surface of an item in coplanar alignment with a first focal plane of said scanning lines;

a second belt means disposed substantially orthogonally to the first belt and including slot means for scanning therethrough and having a surface for aligning a second surface of the item in coplanar alignment with a second respective focal plane of scanning lines;

bar code scanning means for scanning said first and second surfaces of said item including means for establishing an optimum focal plane for resolving the bar code label of objects of varying size and for producing a decoding signal representative of the data contained in said bar code.

26. An apparatus according to claim 25 wherein said means for establishing an optimum focal plane for resolving the bar code of items of varying size includes:

a first laser beam source producing a beam waist whose location is appropriately focused to resolve bar code labels of an item greater than a predetermined width on the package surface opposite other than the aligned surfaces;

a second laser beam source producing a beam waist having a location sufficiently focused to resolve a bar code label of an item smaller than predetermined width on the package surface opposite the polished surface;

sensor means associated with said first and second laser beam sources for activating said first beam source when a item greater than said predetermined width is sensed and for activating said second beam source when an object smaller than said predetermined width is sensed.

27. An apparatus according to claim 26 wherein said means for establishing an optimum focal plane further includes:

a first laser beam source for producing a laser beam along a first path;

a second laser beam source for producing a laser beam along a second path;

a scanning mirror for scanning said first and said second laser beams in a predetermined focal plane;

focusing means for focusing at least a portion of light reflected from the bar code label being scanned by said laser beams;

first and second detector means for detecting said scanned laser beams.

first and second mirror means disposed in said first and second beam paths, respectively, for reflecting said first and second laser beams generally along the axis of said focusing means, said first and second mirrors being positioned such that the angular separation of the first and second laser beams is small enoughт that said beams are both contained within said scanning mirror yet are separated in angle far enough to be detected by said first and second detector means.

28. An apparatus according to claim 26 wherein a third and fourth laser source scan the height of the item and a second height sensor means selectively activates either of said third or fourth laser source in accordance with a predetermined height.

29. An apparatus according to claim 25 wherein said means for establishing an optimum focal plane for resolving the bar code label of objects of varying sides further includes:

a first laser beam source for producing a laser beam;

a second laser beam source for producing a laser beam;

beam combining means for superimposing said first and second laser beams on a single beam path for scanning a bar code label;

focusing means for focusing at least a portion of the light reflecting from the bar code label onto a detector.

30. An apparatus for achieving an improved first pass read rate in an automatic scanner for scanning a bar code label on one or more surfaces of an item moving along an item path and through a scanning region comprising:

a transport means including a first belt means for supportably moving an item along the item path and across a transparent plate for admitting scanning lines of a bar code scanner and a second belt means moving in concert with said first belt and disposed substantially at 90° to said first belt for supportably moving a second surface of said item across a second transparent plate for admitting scanning lines of a bar code scanner, said first and second belts being tilted above the horizontal for registering a face of said item to a respective supporting surface of said belts by gravity, a scanning means for producing a first set of scanning lines defining a focal plane coplanar with the scanning bars of a bar code label of a first surface of the item registered to said first belt, and for generating a second set of scanning lines defining a focal plane coplanar with the scanning bars of a bar code label of a second surface of said item registered to the second belt;

decoding means for decoding said scanning lines generated by said scanning means and for producing an output signal representative of the data derived from said bar code label.

31. A system for positioning a bar code label on a surface of an item moving along a item path, including a scanning region, in an optimal coplanar alignment with the focal plane of a bar code scanner comprising:

a first transparent plate means having a low coefficient of friction for defining said item path;

a second transparent plate having a low coefficient of friction disposed substantially orthogonally to said first plate, said first and second plates being tipped from the horizontal to stabilize a respective face of an item to be scanned with a corresponding surface of said first and second plates;

motive means for passing the item along the path defined by said first and second plates;

a scanning means for producing a first set of scanning lines defining a focal plane coplanar with the plane of said first transparent plate, and for producing a second set of, scanning lines defining a focal plane coplanar with the plane of said second transparent plate;

decoding means responsive to said scanning means for producing an output signal representative of the data associated with the bar code label being scanned.

32. A system according to claim 31 wherein said motive means includes vibration assisted sliding by gravity for passing the item along the item path formed by the first and second plates.

33. A method for preferentially aligning a bar code label on one or more surfaces of an item traveling in an item path including a scanning region comprising the steps of:

aligning a first and second surface of an item against respective orthogonally disposed first and second supporting surfaces tilted at an angle above the horizontal to stabilize the item in a predetermined position;

moving the stabilized item along the item path defined by said first and second supporting surfaces;

scanning the stabilized item in a focal plane coplanar with a first face of the item;

scanning the stabilized item in a focal plane coplanar with a second face of the item;

decoding the scanning signals to read the bar code label on the first and second faces of the item and item information associated therewith;

displaying the decoded information on a moving display as the item travels on the item path.

34. A method according to claim 33 wherein the steps of scanning the first and second faces of the item include:
   arranging a plurality of mirror facets to form a polygonal mirror for reflecting a laser beam;
   arranging a plurality of rectangular mirrors to direct the reflected laser beam from the polygonal mirror to describe a predetermined locus of scan lines defining one or more focal planes, each substantially coplanar with a respective corresponding face of an item being scanned.

35. A method according to claim 33 wherein the step of scanning an item includes the steps of:
   providing a focal plane of scan lines by first reflecting a laser beam from a polygon of M facets;
   directing the reflected laser beam from an array of M mirrors;
   producing M×N scan lines which are substantially parallel to but are spaced apart from each other;
   forming a space between the scan lines by tilting the polygon mirror facets and the mirrors of the array at a desired angle.

36. In a bar code label scanning system, means for scanning a scanning region with multiple depths of focus comprising:
   a first laser beam source for producing a laser beam along a first path;
   a second laser beam source for producing a laser beam along a second path;
   one or more scanning mirrors for scanning said first and second laser beams in a scanning volume;
   first and second mirror means disposed in said first and second beam paths, respectively for reflecting said first and second laser beams generally along the axis of a focusing means wherein said first and second mirror means are positioned such that the angular separation of the first and second laser beams is small enough that the beams are both contained within the scanning mirror and are separated in angle far enough to be detected by a first and second detector means
   focusing means for focusing at least a portion of light reflected from a bar code label being scanned to said first and second detector means.

37. A system for preferentially aligning an item moving along an item path and through a scanning region to provide an optimal reading of a label, including
   means for positioning and stabilizing at least two sides of the item in alignment with one or more focal planes of scanning lines from a scanner for decoding a label and
   means for producing a scanning volume having multiple depths of focus, comprising:
   scanner means for scanning one or more beams along a plurality of beam paths, each beam path having a different depth of focus for optimally resolving labels of items located at different distances from the scanner means;
   first and second mirror means for injecting said beams into the scanning region for resolving a label;
   one or more detector means for detecting reflected light from the label being scanned by said beams;
   focusing means for focusing reflected light from said beams to a respective detector means.

* * * * *